United States Patent [19]

Wolf

[11] Patent Number: 5,333,318

[45] Date of Patent: Jul. 26, 1994

[54] CREATING AND SEARCHING A QUAD LINKED LIST IN A TRUNKED COMMUNICATION SYSTEM

[75] Inventor: Herbert R. Wolf, Elk Grove Village, Ill.

[73] Assignee: Motorola, Inc., Schaumburg, Ill.

[21] Appl. No.: 46,465

[22] Filed: Apr. 12, 1993

Related U.S. Application Data

[63] Continuation of Ser. No. 589,462, Sep. 27, 1990, abandoned.

[51] Int. Cl.[5] .............................................. G06F 15/40
[52] U.S. Cl. .................................. 395/600; 395/425; 364/DIG. 1; 364/251; 364/251.5; 364/254; 364/254.6; 364/282.1
[58] Field of Search ....................... 395/600, 650, 425; 364/715.01

[56] References Cited

U.S. PATENT DOCUMENTS

| | | | |
|---|---|---|---|
| 4,758,977 | 7/1988 | Morimoto et al. | 364/419.03 |
| 4,815,030 | 3/1989 | Cross et al. | 395/600 |
| 4,930,072 | 5/1990 | Agrawal et al. | 364/300 |
| 5,089,954 | 2/1992 | Rago | 395/600 |
| 5,093,927 | 5/1992 | Shanley | 455/34 |
| 5,095,529 | 3/1992 | Comroe et al. | 455/16 |
| 5,101,502 | 3/1992 | Felderman et al. | 455/34 |
| 5,129,083 | 7/1992 | Cutler et al. | 395/600 |
| 5,136,712 | 8/1992 | Perazzoli, Jr. et al. | 395/700 |
| 5,151,989 | 9/1992 | Johnson et al. | 395/600 |

OTHER PUBLICATIONS

Knuth, Donald E., *The Art of Computer Programming*, Addison Wesley Publishing Co. (Boston, 1968) pp. 285–286.

*Primary Examiner*—Thomas C. Lee
*Assistant Examiner*—Paul R. Lintz
*Attorney, Agent, or Firm*—John W. Hayes

[57] ABSTRACT

A quad linked data structure that provides bidirectional search capability for multiple related fields within a single record. The data base is searched by providing sets of pointers at intervals of N data entries to accommodate a binary search of the pointers followed by a linear search of the resultant range to locate an item of interest and its related field.

2 Claims, 4 Drawing Sheets

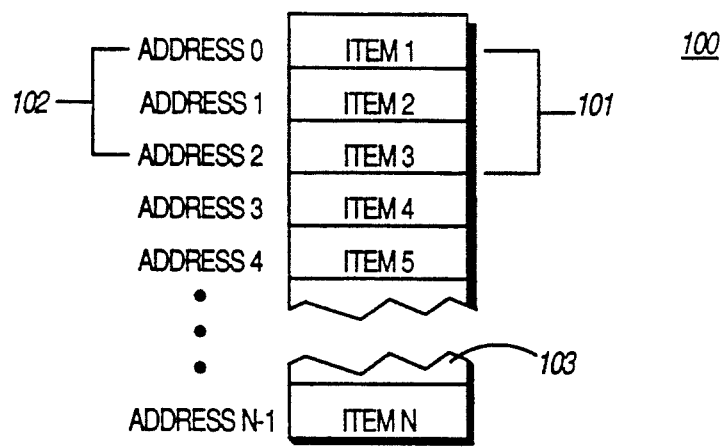
FIG.1 -PRIOR ART-
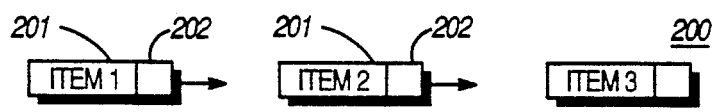
FIG.2 -PRIOR ART-
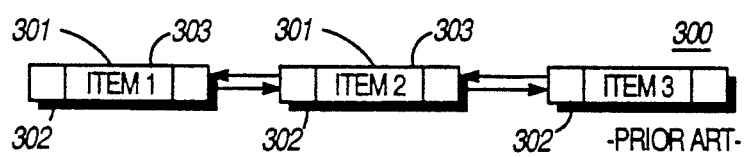
FIG.3 -PRIOR ART-
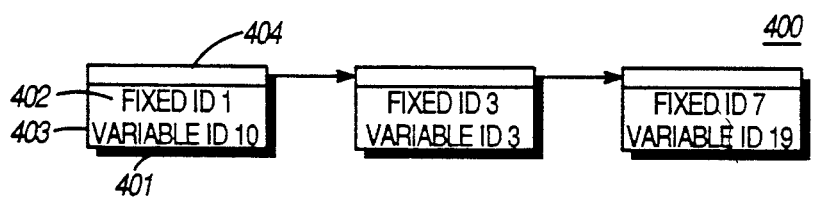
FIG.4
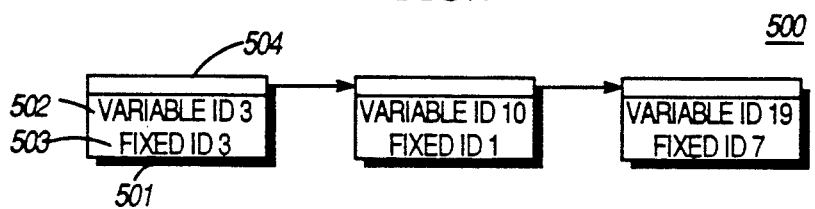
FIG.5
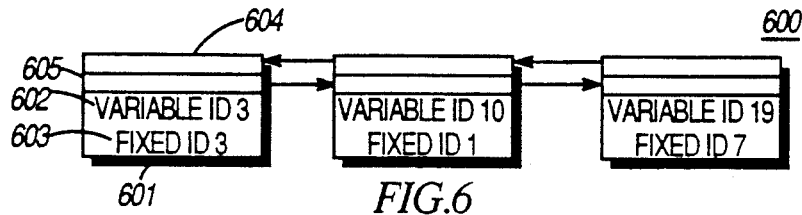
FIG.6

CREATING AND SEARCHING A QUAD LINKED LIST IN A TRUNKED COMMUNICATION SYSTEM

This is a continuation of application Ser. No. 07/589,462, filed Sep. 27, 1990 and now abandoned.

TECHNICAL FIELD

This invention relates generally to data structures for storing and accessing data and in particular to a linked list data structure permitting bidirectional searches, and is more particularly directed toward a method for creating and searching a linked list having four link elements or threads.

BACKGROUND OF THE INVENTION

Searchable data structures containing related data elements are well-known in the art. One simple example of such a structure is the data stack. In a stack, the data elements occupy successive address locations in computer memory, and are generally arranged in a predetermined order (i.e., alphabetical, numerical, etc.) in order to facilitate searching. Of course, one obvious disadvantage of such a structure is that the addition or removal of a data element would require massive reallocation of data element storage in order to preserve the order required for an effective search.

A linked list data structure eliminates this requirement for reordering upon modification of the structure. In a singly linked list, a pointer to the next element in the list is stored along with the data element itself. If a new item is inserted, the only restructuring required is the modification of the link pointers for the two elements between which the new element is inserted. For removal of an element in the list, only one link pointer need be changed to point to its new successor. Linked lists require more memory than stack data structures, since each element of the list must have an associated pointer. Searching also takes longer, since both link pointer values and data element values must be examined during execution of the search procedure.

Singly linked data structures, as described above, are searchable in one direction only (the direction in which the links are constructed). A doubly linked list, which has pointers associated with both the predecessor and successor elements of each data element, is capable of being searched in either direction, but at the cost of greatly increased memory overhead to accommodate storage of more pointer elements.

Even a doubly linked list, however, is not a suitable data structure when each data record contains multiple related elements. It is often necessary to build a data structure having the capability to be searched for one of two related items in order to find the other. For example, large personal information data bases containing data elements such as Social Security Number (SSN) and person's name lose substantial utility if a search cannot be conducted that yields a person's name in response to an SSN entry, or returns the SSN if the name is entered.

Data bases constructed for use in communication systems are often subjected to the constraint of real time search capability in addition to limited memory availability. Systems that depend for efficient operation upon the capability to rapidly search data bases for related identification (ID) information cannot operate effectively in an environment that inherently requires large amounts of memory and limits search speed.

Accordingly, a need arises for a data structure that supports rapid searches for related data elements without imposing excessive memory requirements.

SUMMARY OF THE INVENTION

For a data structure accommodating a plurality of first and second data elements, the above-described need is satisfied by a method for relating first data elements with other first data elements and second data elements with other second data elements. The method comprises storing the first data elements with corresponding second data elements and providing first and second sets of associated pointers, wherein the first set of pointers links together the first data elements, and the second set of pointers links together the second data elements.

In order to search the data base constructed in accordance with the method disclosed for a particular predetermined data element, the first and second sets of data elements are organized by providing a first set of pointers that link together the first data elements and a second set of pointers that link together the second data elements. A third set of pointers that is associated with the first or second data elements is established. An attempt is made to locate the particular predetermined data element by utilizing the third set of pointers, and, in the event that the attempt is unsuccessful, the particular predetermined data element is located by utilizing the first or second sets of pointers.

BRIEF DESCRIPTION OF THE DRAWINGS

FIG. 1 depicts a sequential list data structure of the prior art;

FIG. 2 shows a singly linked list;

FIG. 3 illustrates a doubly linked list;

FIG. 4 is a diagram of related data elements stored in records that are part of a singly linked list ordered with respect to one of the fields;

FIG. 5 depicts multiple-field records ordered with respect to another field in a singly linked list;

FIG. 6 shows multiple-field records in a doubly linked list ordered with respect to one of the fields;

DETAILED DESCRIPTION OF THE INVENTION

Figure 7:
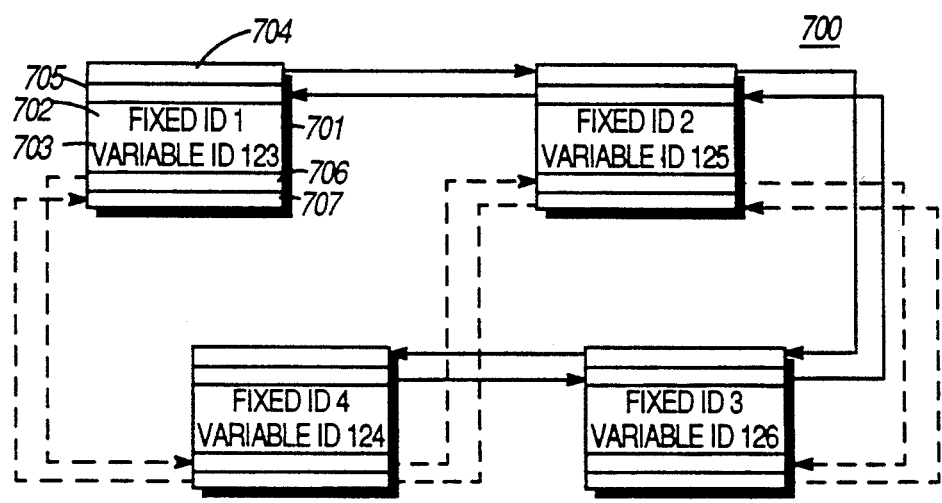
FIG. 7 illustrates a quad linked data structure according to the present invention.

A sequential list data structure of the prior art is shown in FIG. 1, as generally depicted by the number 100. This type of data structure is often termed a linear list, since linear search techniques, wherein each item is examined in sequence starting from the beginning, are often used to search this type of structure. Of course, a binary search, where the collection of data elements is bisected and the mid-point value is compared with the search value before bisecting again, can also be implemented with a linear list.

In a linear list, a collection of data items (101) is stored in a memory (103), with the items arranged sequentially in order of address (102). This type of ordering of data elements is useful primarily for information that is relatively fixed. New items may be added to the end of a sequential data structure provided the new items follow the same sequential ordering as the remainder of the list. Of course, items may not be removed from the list arbitrarily.

FIG. 2 illustrates a singly linked data structure known in the art, as depicted by the number 200. A collection of data elements (201) may be stored in arbitrary memory locations as long as each data item (201) has associated with it a pointer (202) that indicates the location of the next data item. A singly linked list permits the addition and deletion of data items, provided the pointer values are properly adjusted. When a new item is added, the pointer value associated with the predecessor item is adjusted to point to the new element, while the pointer associated with the new item is changed to point to its new successor. When an item is deleted, the pointer value associated with the predecessor item is adjusted to point to its new successor (the item immediately after the one being deleted). Although singly linked lists are very flexible in terms of adding and deleting data elements, more memory is required than with linear structures due to the use of pointers. In addition, because of the arbitrary assignment of data elements to memory locations (the ordering exists in the pointers rather than in the order of memory addresses), linear searching techniques must be used with linked lists.

Of course, singly linked lists are only searchable in one direction; that is, the direction in which the pointers are established. For a data structure that is searchable in either direction, another set of pointers that connects the data elements from the end of the list to the beginning is required. The structure just described is a doubly linked list, shown in FIG. 3 and generally depicted by the number 300.

A collection of data elements (301) is arranged in arbitrary memory locations. There is a pointer (303) associated with each data element (301), that points to the successor element, as well as a pointer (302) that points to the predecessor element. There is a set of pointers that orders the list from start to end as well as from end to start. Thus, a doubly linked list structure is searchable in either direction, although, just as with singly linked lists, a linear search technique is required. In addition, memory requirements for a doubly linked list are even more onerous than for the singly linked variety.

Data structures containing related ID information and requiring a fast search capability are frequently required in RF (radio frequency) communication systems. A trunked communication system, known in the art, is an example of a system having these requirements. Communication resources (i.e., RF channels) are assigned to requesting communication units based, at least in part, upon ID information. In some cases, more than one ID may be used to refer to a single user. This situation exists, for example, in trunked radio systems used to provide communication services to transit users, such as metropolitan bus and train systems. Not only do the communication units installed in each bus or train have individual ID's (sometimes termed a unit ID or fixed ID), but the vehicles themselves are often identified by route or run number. Since the route or run of a given vehicle may change frequently, this identification information is often termed a variable ID. Of course, any data base utilized to store this related ID information must be very flexible in terms of permitting changes, additions, and deletions of ID information.

FIG. 4 illustrates a data structure, as generally depicted by the number 400, that relates a plurality of first data elements (402), in this case fixed ID's, with a plurality of second data elements (403), which, in this example, comprise variable ID's. By storing a first data element along with its corresponding second data element, the requisite relationship between the first and second data elements is established. In FIG. 4, FIXED ID 1 is related to VARIABLE ID 10, FIXED ID 3 is related to VARIABLE ID 3, etc. In addition, the data structure (400) provides link pointers (404) to associate each data record (401) with its successor. In this example, the records are ordered with respect to the fixed ID field of the record. In other words, the pointers are established to create an ordered set of fixed ID's, without regard to the associated variable ID fields. This is a modification of the conventional singly linked list structure that permits the collection of fixed ID's to be searched for the corresponding variable ID's.

Of course, since the pointers of the linked list of FIG. 4 were not established with regard to the variable ID fields, the desirable feature of being able to search the records for either fixed ID's or variable ID's is not available here. The structure shown in FIG. 5, generally depicted by the number 500, is a singly linked list structure that arranges fixed ID/variable ID records to establish an ordered relationship with regard to the variable ID fields. As can be seen from the figure, each record (501) has an associated pointer (504) that points to its successor in such a way that the variable ID fields (502) are placed in numerical order without regard to the fixed ID values (503).

FIG. 6 shows a data structure, as generally depicted by the number 600, that applies a doubly linked list ordering, with respect to the variable ID fields (602), to the fixed ID/variable ID records (601). Each record (601) has an associated forward link pointer (604) that orders the records (601) from start to end with respect to the variable ID fields (602), as well as a reverse link pointer (605) that accomplishes a similar ordering from end to start. Although the ordering described is done without regard to the fixed ID field values (603), it does permit bidirectional searching of the variable ID information.

In order to implement the extensive bidirectional search capability required with respect to both fields of the records, a quad linked data structure is provided, as shown in FIG. 7 and generally depicted by the number 700. Links or pointers used in linked list data structures are also frequently termed "threads," since they "sew" together the elements within the data base. Thus, the structure illustrated in FIG. 7 may also be called a quad threaded data base.

As shown in the figure, each data record (701) contains related fixed ID fields (702) and variable ID fields (703). In order to implement a bidirectional search capability with respect to the data elements of both fields, four pointers are associated with each record. A first pointer (704) effects a proper ordering, from start to end, of the fixed ID fields (702), while a second pointer (705) provides the proper ordering of these fields (702) from end to start, to permit bidirectional searches.

Similarly, to establish a proper start to end ordering of the variable ID fields (703) of the records (701), a set of forward pointers (706) for the variable ID fields (703) is provided. For end to start ordering, a set of reverse pointers (707) is also included. For the sake of clarity, and to illustrate the proper numeric ordering of the data element fields stored within the records, solid lines in the figure interconnect the links for the fixed ID fields, while dashed lines are used to highlight the ordering of the variable ID fields.

Even though the arrangement described above permits the data elements of either field to be searched in order to find the related element in the other field, and is very flexible in allowing changes to the data structure through the use of the doubly linked list techniques already described, relatively slow linear searching techniques would still be required. Of course, one way around this requirement would be to simply establish pointers to each record, arranged in a suitable search order. Since the actual location in memory of each record is arbitrary in a linked list structure, the pointers would have to be arranged in proper searchable order (i.e., in an order reflecting the numerical or alphabetical order of the data fields). This process, however, would require considerable additional computation and memory storage, even though it would permit the use of relatively fast binary search techniques.

A compromise technique limits the additional memory and computation required, while still permitting rapid searches of the data base. Instead of assigning pointers to each record, a pointer is assigned only every N records, where N is an arbitrary value designed to optimize search time while minimizing additional memory requirements. In the preferred embodiment, N is equal to 16. Of course, since the ordering of the fixed ID fields is different from the ordering of the variable ID fields, a set of pointers must be maintained for each field, even though the data elements are parts of the same record.

Figure 8:
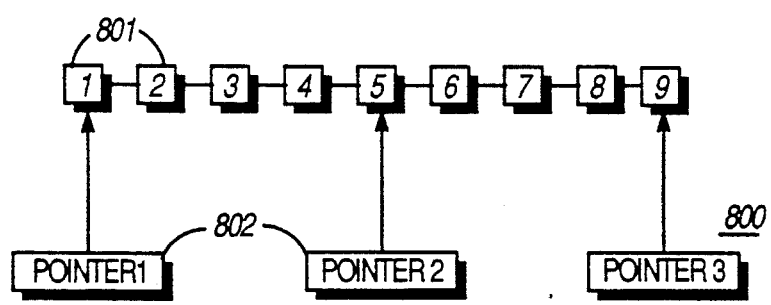
FIG. 8 is a diagram of the pointer structure used to search a quad linked list.

FIG. 8 illustrates how the data structure may be searched through assignment of the above-described sets of pointers. In FIG. 8, a quad linked data structure, as generally depicted be the number 800, is illustrated. Each record (801) of the structure shown is of the form illustrated in FIG. 7. For the sake of simplicity, only one set of pointers is shown, and the number N is set at 4.

When the data structure (801) is created, a pointer value (802) is assigned to every fourth record. Of course, as mentioned above, a set of pointers is computed for each data field within the record, but only one set is shown in the figure for the sake of clarity. When it comes time to search the data base, a binary search is done on the pointers to establish the range within which the desired search object resides. Then, a linear search is executed over the relatively small range of values isolated by the binary search in order to find the target value. Of course, whenever an addition or deletion is made to the data base, the pointer values below and including the pointer that defines the upper limit of the range affected must be recomputed, in order to ensure that the pointer interval remains equal to N.

Figure 9:
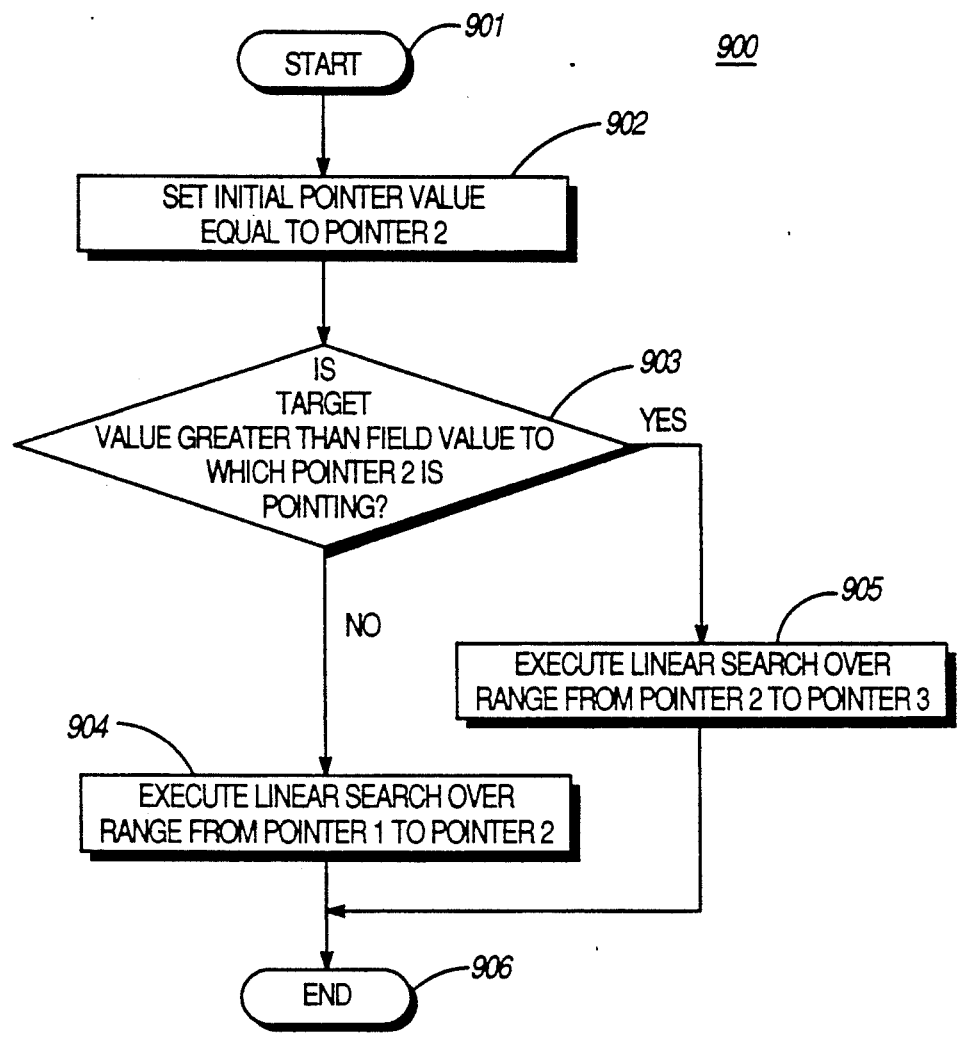
FIG. 9 is a flow chart depicting a method for searching a quad linked list.

FIG. 9 illustrates the search procedure, generally depicted by the number 900, that would be used to locate a target field value in the data structure shown in FIG. 8. Upon leaving the START state (901), the algorithm depicted causes the initial pointer value to be set equal to POINTER 2 (block 902). POINTER 2 is the midpoint of the pointers shown in FIG. 8. Of course, for a large collection of records, there would be many pointers, and a computation step would be required to establish the midpoint.

The target value is compared to the field value to which POINTER 2 points in block 903. If the target value is not greater than the field value in the record indicated by the pointer, then a linear search is executed over the range from POINTER 1 to POINTER 2 (block 904). If, on the other hand, the target value is greater, the range from POINTER 2 to POINTER 3 is subjected to a linear search in block 905. In either event, the algorithm then terminates at the END state (906).

For a data structure having many more records than those shown in FIG. 8, the process of dividing in half and searching subranges would continue until it is determined that the target value lies within a subrange defined by two adjacent pointers. The field values in that subrange would then be searched in a linear fashion to locate the target value.

Figure 10:
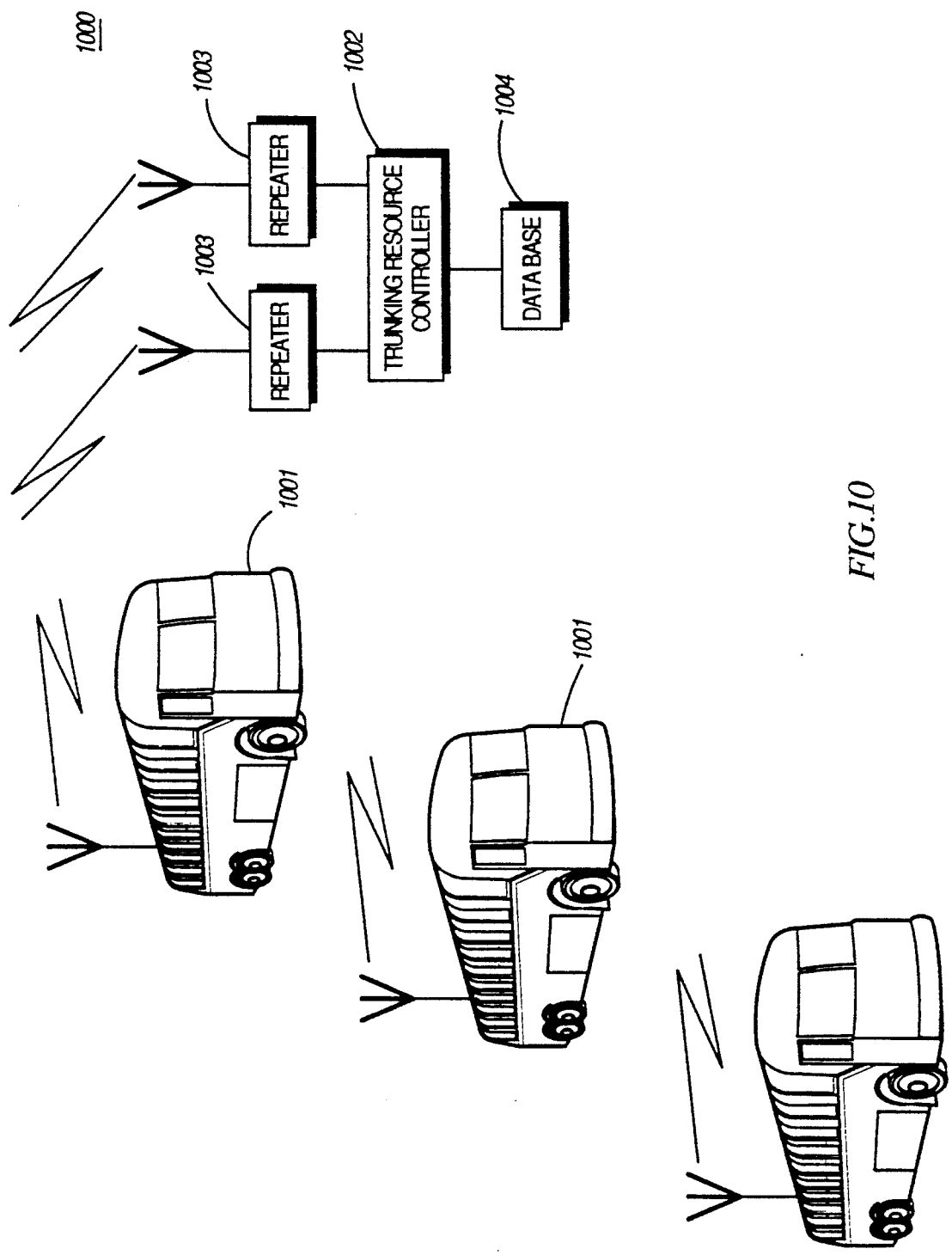
FIG. 10 depicts a trunked communication system employing the data structure of the present invention.

FIG. 10 shows a trunked communication system, generally depicted by the number 1000, that provides communication services to communication units such as transit vehicles (1001). Of course, the communication units need not be transit vehicles in order to use the system. In the system shown, a trunked resource controller (1002) provides communication services to requesting communication units over one or more trunked repeaters (1003). In assigning communication resources to requesting communication units (1001), the resource controller (1002) accesses a quad linked data base (1004) in order to relate fixed ID and variable ID information.

What is claimed is:

1. A trunked communication system that provides communication services to requesting communication units through access to a quad linked data base relating first and second data elements, the system comprising:
   one or more communication units that request communication services from time to time;
   one or more trunked repeater stations that provide RF communication resources for requesting communication units;
   trunked resource controller means for maintaining control over associated trunked repeater stations and for assigning communication resources to requesting communication units wherein the trunked resource controller includes;
   means for storing the first data elements with corresponding second data elements; and
   means for providing first and second sets of associated pointers, wherein the first set of pointers links together the first data elements, and the second set of pointers links together the second data elements.

2. A computer implemented method for organizing and searching a set of related records, wherein each record includes:
   i) a fixed ID field; and
   ii) a variable ID field; the method comprising the steps of:
   (a) generating first and second sets of link pointers, wherein the first set of link pointers points to successor elements of the set of related records when the records are ordered with respect to the fixed ID field, and the second set of link pointers points to predecessor elements of the set of related records when the records are ordered with respect to the fixed ID field;
   (b) generating third and fourth sets of link pointers, wherein the third set of link pointers points to successor elements of the set of related records when the records are ordered with respect to the variable ID field, and the fourth set of link pointers points to predecessor elements of the set of related records when the records are ordered with respect to the variable ID field;

(c) generating first and second sets of field pointers, wherein the first set of field pointers includes an ordered set of pointers that point to every Nth fixed ID field when the records are ordered with respect to the fixed ID field, and the second set of pointers includes an ordered set of pointers that point to every Nth variable ID field when the records are ordered with respect to the variable ID field;

(d) when searching for a particular record by reference to its fixed ID field, conducting a binary search of the first set of field pointers to determine an initial pointer and a final pointer defining a range within which the particular record is located;

(e) examining by linear search, the fixed ID fields within the range determined in step (d) to locate the particular record;

(f) when searching for a particular record by reference to its variable ID field, conducting a binary search of the second set of field pointers to determine an initial pointer and a final pointer defining a range within which the particular record is located;

(g) examining, by linear search, the variable ID fields within the range determined in step (f) to locate the particular record.

* * * * *